United States Patent [19]
Falk

[11] Patent Number: 4,721,461
[45] Date of Patent: Jan. 26, 1988

[54] INSULATIVE PANEL LAMINA

[76] Inventor: Richard A. Falk, 600 Flamingo Dr., Ft. Lauderdale, Fla. 33301

[21] Appl. No.: 11,356

[22] Filed: Jan. 27, 1987

Related U.S. Application Data

[63] Continuation of Ser. No. 821,966, Jan. 24, 1986, abandoned.

[51] Int. Cl.⁴ .......................... F27D 1/00; F23M 5/00
[52] U.S. Cl. .................................... 432/247; 110/332; 110/336; 110/340; 432/250
[58] Field of Search ............... 432/210, 247, 249, 250, 432/226; 110/173 A, 339, 340, 332, 336; 266/236, 285

[56] References Cited

U.S. PATENT DOCUMENTS

| | | | |
|---|---|---|---|
| 1,716,341 | 6/1929 | Fuller | 432/247 |
| 1,790,820 | 2/1931 | Kutchka | 432/210 |
| 2,091,224 | 8/1937 | Brinckerhoff et al. | 432/250 |
| 2,736,278 | 2/1956 | Boyles | 110/332 |
| 3,094,952 | 6/1963 | Heuer | 110/340 |
| 4,574,995 | 3/1986 | Sauder et al. | 110/336 |

*Primary Examiner*—Henry C. Yuen
*Attorney, Agent, or Firm*—Fuller, Puerner & Hohenfeldt

[57] ABSTRACT

An insulative panel prevents heat transfer from a molten metal melt. The panel comprises a reinforced refractory slab supported along its edges. An insulation layer is placed on top of the refractory slab, thereby creating a hot zone between the molten metal and the insulation layer and a cold zone in and above the insulation layer. Reinforcing members are placed in the cold zone on top or within the insulation layer vertically above reinforcing rods in the refractory slab. Hangers extending downwardly from the reinforcing members through the insulation layer and refractory slab are joined to the reinforcing rods for supporting the reinforcing rods in the hot zone by the reinforcing or support members in the cold zone.

8 Claims, 3 Drawing Figures

U.S. Patent  Jan. 26, 1988  4,721,461
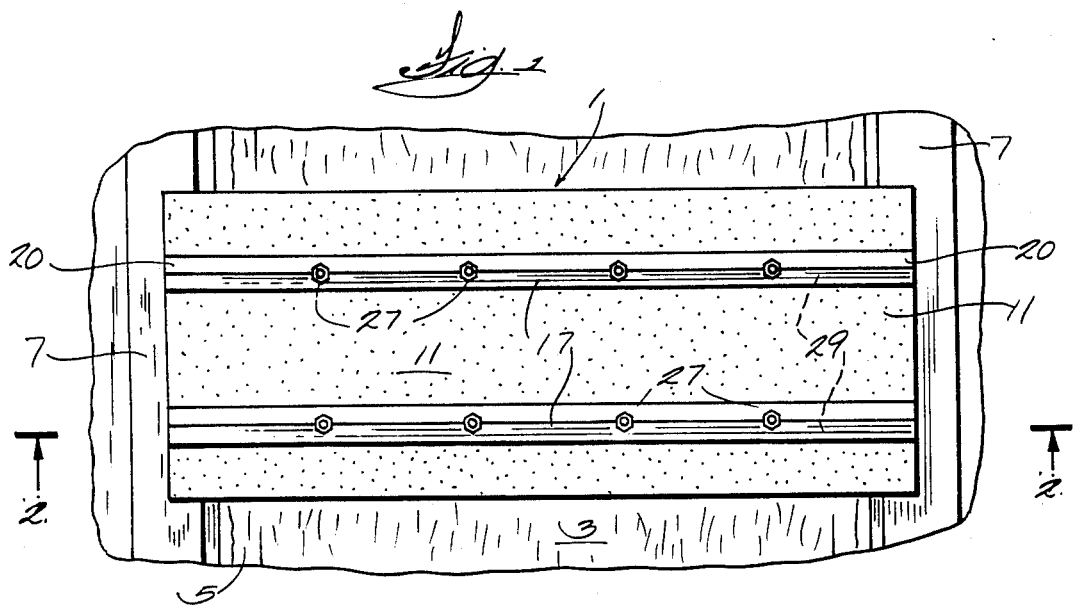
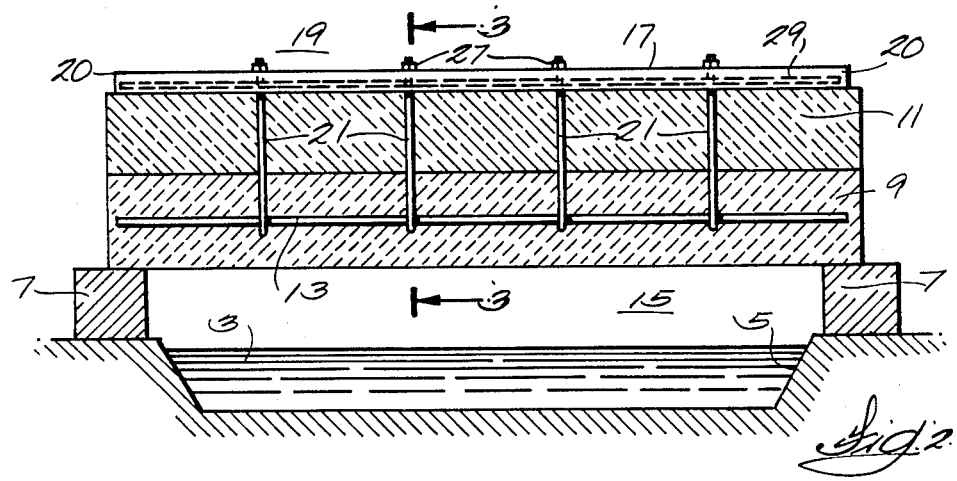
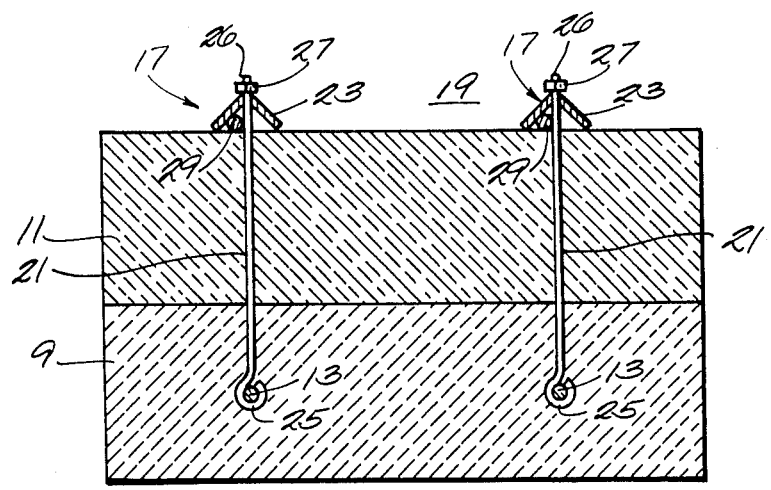

INSULATIVE PANEL LAMINA

This is a continuation of co-pending application Ser. No. 821,966 filed on Jan. 24, 1986, abandoned.

BACKGROUND OF THE INVENTION

1. Field of the Invention

This invention pertains to insulation, and more particularly to apparatus for insulating molten metal.

2. Description of the Prior Art

Various equipment has been designed to insulate molten metal such as metal flowing from a hot ladle in foundry ladles, induction furnaces and other melts. It is essential that the metal remain at a temperature well above the freezing point as it is transferred from the ladle to the desired molds. In some instances, the molten metal is poured into a trough for running therealong to a torpedo car, from which the metal is poured into the molds. The trough must be very well insulated to retain the molten metal well above the minimum pouring temperature as the molten metal flows in the trough. Additionally, it is desirable to cover the metal to contain dust and fumes for pollution control and to control energy loss.

Examples of prior materials for covering troughs and thus reducing undesirable cooling of the molten metal include refractory slabs and metal slabs. Both types of slabs are supported at two opposite edges by suitable sills on opposite sides of the trough. Refractory slabs possess the disadvantage of being very expensive and heavy. The refractory slabs, which may be about 10 to 12 inches thick, require intermediate supports for the span between the trough sills. The supports are usually in the form of metal reinforcing rods extending through the slabs in the direction perpendicular to the flow of the molten metal. Reinforced refractory slabs are not satisfactory because the extremely high temperature of the molten metal causes the reinforcing rods to sag and even melt. As a result, the reinforcing rods do not adequately support the refractory slabs, and the refractory slabs frequently crack.

Metal slabs are unsatisfactory for covering molten metal troughs because they attain a temperature approaching that of the molten metal. The hot metal slabs then radiate excessive heat to nearby foundry equipment and workers. Also, metal slabs sag because of exposure to the hot molten metal and must be periodically replaced.

Thus, a need exists for improved insulation for molten metal flowing in a foundry trough.

SUMMARY OF THE INVENTION

In accordance with the present invention, apparatus is provided that insulates flowing molten metal in a more effective manner than was previously possible. This is accomplished in one embodiment by a panel in the form of a laminate containing a hot zone laminae or reinforced refractory slab that is supported by reinforcing members located thermally remote from the molten metal in an insulating laminae.

The refractory or hot zone lamina slab may be of conventional refractory material, graphite of a layer of steel could be used. The refractory slab is supported at opposite ends thereof on sills located on both sides of a molten metal carrying trough, thereby spanning the trough. To support the refractory slab between the supported ends, reinforcing rods are inserted through the refractory slab in a direction transverse to the longitudinal axis of the trough.

To create a cold zone thermally separated from the hot molten metal, an insulation layer or laminae cold zone is placed on top of the refractory slab. The insulation layer may be of any suitable insulation material, but it preferably is a lightweight refractory fiber insulating board. The upper surface of the insulating layer is thus in a cold zone relative to the molten metal.

Placed on top of or within the upper surface of the insulation layer are one or more reinforcing members that lie approximately vertically above the reinforcing rods in the refractory slab. The reinforcing members may be in the form of angle irons. Hangers or ties of suitable design are suspended from the reinforcing members and pass through appropriate holes in the insulation layer or around the insulation layer to the reinforcing rods in the refractory slab. Consequently, the refractory slab is supported both at the transverse ends thereof by the sills and also by the reinforcing members on top of the insulation layer. Since the reinforcing members are insulated from the high temperatures of the molten metal, they do not sag due to thermal causes. As a result, sagging and distortion of the reinforcing rods within the refractory slab due to the heat of the molten metal, with attendant cracking and crumbling of the refractory material, is eliminated.

Other objects, aims, and advantages of the invention will become apparent from the disclosure.

BRIEF DESCRIPTION OF THE DRAWINGS

FIG. 1 is a top view of a trough suitable for carrying molten metal and partially covered by an insulative panel lamina of the present invention;

FIG. 2 is a sectional view taken along lines 2—2 of FIG. 1; and

FIG. 3 is a sectional view taken along lines 3—3 of FIG. 2.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIGS. 1 and 2, an insulative panel lamina 1 is illustrated that includes the present invention. The lamina is especially useful for insulating molten metal 3 flowing in a generally horizontal trough 5, but it will be understood that the invention is not limited to foundry applications.

The molten metal 3 may be flowing from a ladle, not shown, to a torpedo car or other destination at the end of the trough 5. To reduce heat transfer from the molten metal, the lamina 1 is placed on sills 7 which straddle the trough so that the lamina spans the trough.

In accordance with the present invention, the lamina 1 is comprised of a lower refractory slab 9 and an upper insulation layer 11. The refractory slab 9 may be of any suitable refractory material that is known in the art. To provide sufficient rigidity and strength to the refractory material, one or more metal, graphite or other suitable reinforcing structure or rods 13 are inserted through the refractory slab transversely to the longitudinal axis of the trough. Preferably, the reinforcing rods 13 are made of $\frac{3}{8}$ inch or $\frac{1}{2}$ inch black iron pipe. The reinforcing structure does not have to be in the form of rods or pipe. Any shape such as a beam or plate can be employed which can provide structural integrity in the hot zone.

The upper insulation layer 11 of the lamina 1 may be of any suitable insulative material, such as insulation board, refractory board, or a wool blanket manufactured by Johns Manville Corporation under the trademark CERA. However, the preferred material for the insulation layer is a lightweight refractory fiber insulating board manufactured by Midwest Instrument Co. of Hartland, Wisconsin, under the trademark MINCAST. A particularly desirable composition for the fiber insulating board comprises 30% $SiO_2$-C powder, 25 mesh, 40% $SiO_2$-C $\frac{1}{8}$ inch granules with a particle size retained by $\frac{1}{8}$ inch mesh screen, with the powder comprising 84% $SiO_2$, 15% carbon, and 1% other elements, and with the granules comprising about 96% $SiO_2$, 3% carbon, and 1% other elements.

With the refractory slab 9 and insulation layer 11 in place over the trough 5 and molten metal 3, a hot zone 15 is created between the molten metal and the insulation layer. Temperatures in the hot zone can be as high as 2800 to 3000 degrees Fahrenheit. At that high temperature, the reinforcing rods 13 tend to melt and sag, and therefor lose their ability to support the refractory slab intermediate the sills 7. Normally, that is detrimental to the performance of the refractory slab.

To provide support to the reinforcing rods 13 when exposed to the extreme temperatures of the hot zone 15, the present invention includes reinforcing members 17 that are located in a cold zone 19 thermally separated from the hot zone by the lamina 1. In the construction illustrated in FIG. 3, the reinforcing members 17 are manufactured in the form of angle irons 23 that are placed on top of the insulation layer 11. The angle irons 23 are in approximate vertical alignment with the reinforcing rods. The ends 20 of the angle irons are directly over the sills 7, so that the angle irons span the trough 5, FIGS. 1 and 2. To join the reinforcing rods and the angle irons, a series of ties or hangers 21 are used with each associated reinforcing rod and angle iron. The hangers 21 extend through appropriate vertically aligned holes in the refractory slab 9 and insulation layer. The lower end of each hanger is preferably shaped with a hook 25 for receiving a reinforcing rod. The upper end 26 of each hanger is threaded and passes through corresponding holes in the angle iron. Nuts 27 are employed to adjustably draw the reinforcing rods upwardly to be supported by the angle iron. Because the angle irons are in the cold zone 19, they do not sag due to the hot temperature in the hot zone. Consequently, the angle irons support the reinforcing rods, along with the refractory slab, against failure due to high temperatures in the hot zone.

Referring to FIG. 3, an alternate construction of the reinforcing members 17 is shown schematically. In some instances, a rod 29 may be desirable in addition to or in place of an angle iron 23. The rods 29 may be welded to the hangers 21, or they may be of sufficient size to have a vertical hole therethrough for receiving the hanger ends 26. Nuts 27 would be employed to adjustably draw the reinforcing rods 13 toward the rods 29 for support thereby.

The thickness of the refractory slab 9 of the lamina 1 may be about four inches. Because of the superior insulating qualities of the Mincast insulation material, the insulation layer 11 need be only about one inch. A typical width of the lamina is about one foot. The length of the lamina will vary to suit the span of the sills 7. A typical length is about five feet. Preferably, two sets of reinforcing rods 13 and angle irons 23 are used for each one foot wide lamina.

The product described herein can be used as a cover for ladles, used with induction furnaces and to cover melts of any molten metal. Use of the product conserves heat, reduces energy loss and contains dust and fumes. Although the disclosed construction shows the cold zone reinforcing including rods which extend into the hot zone, the reinforcing structure can pass or wrap around the hot zone reinforcing.

Thus, it is apparent that there has been provided, in accordance with the invention, an insulative panel lamina that fully satisfies the objects, aims and advantages set forth. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A self-reinforcing insulative panel lamina for being supported by spaced vertical supports comprising:
   a. a one piece refractory slab having top and bottom surfaces and longitudinally opposed ends, the refractory slab being adapted to be vertically supported by the vertical supports on the bottom surface adajcent the longitudinally opposed ends to thereby create an unsupported interior portion between the vertical supports and adapted to be exposed to very high temperatures;
   b. at least on reinforcing rod extending longitudinally through the refractory slab;
   c. a one piece insulation layer having top and bottom surfaces and longitudinally opposed ends, the insulation layer being approximately coextensive in area with the refractory slab, the insulation layer bottom surface being in contact with and supported by the top surface of the refractory slab;
   d. support means supported on the top surface of and extending between the opposed longitudinal ends of the insulation layer for being supported solely by th e refractory slab and insualtion layer and in thermal separation from the refractory slab, the support means having ends terminating between the insulation layer opposed longitudinal ends and over the vertical supports acting on the refractory slab bottom surface; and
   e. tie means for joining the support means to the reinforcing rod, so that the longitudinally opposed ends of the refractory slab and insulation layer provide the sole support for the ends of the support means to thereby enable the portion of the support means between the ends thereof to reinforce the unsupported interior of the refractory slab and the support means is unaffected by high temperatures to thereby adequately support the reinforcing rods and refractory slab exposed to high temperatures.

2. The insulative panel lamina of claim 1 wherein the insulation layer is composed of a lightweight refractory fiber insulating board.

3. The insulative panel lamina of claim 2 wherein the insulation layer is a composition comprising 30% high temperature refractory cement, 30% $SiO_2$-C powder, 25 mesh, 40% $SiO_2$-c $\frac{1}{8}''$ granules with a particles size retained by ⅛" mesh screen, and wherein the powder comprises 84% SiO$_2$, 15% carbon, 1% other elements, and the granules comprise 96% SiO$_2$, 3% carbon and 1% other elements.

4. A self-reinforcing insulative panel lamina for being supported by spaced vertical supports comprising:
   a. a one piece refractory slab having top and bottom surfaces and longitudinally opposed ends, the refractory slab being adapted to be vertically supported by the vertical supports on the bottom surface adjacent the longitudinally opposed ends to thereby create an unsupported interior portion between the vertical supports and adapted to be exposed to very high temperatures;
   b. at least one reinforcing rod extending longitudinally through the refractory slab;
   c. a one piece insulation layer having top and bottom surfaces and longitudinally oppposed ends, the insulation layer being approximately coextensive in area with the refractory slab, the insulation layer bottom surface being in contact with and supported by the top surface of the refractory slab;
   d. at least one angle iron having opposed longitudinal ends that terminate between the longitudinal ends of the refractory slab and insulation layer, the angle iron being placed on the insulation layer in an inverted V-configuration with the two angle iron edges in facing contact with and supported solely by the insulation layer and with the junction of the angle iron legs located above the leg edges, an angle iron being placed in vertical alignment with each reinforcing rod in the refractory slab, each angle iron defining vertical holes therethrough at the junction of the angle iron legs; and
   e. at least one hanger having a lower end joined to a reinforcing rod and a threaded upper end passing through an angle iron hole, and a fastener on the hanger threaded for adjustably drawing the reinforcing rod toward the angle iron, so that the longitudinally opposed ends of the refractory slab and insulation layer provide the sole support for the ends of the angle iron to thereby enable the portion of the angle iron between the ends thereof to reinforce the unsupported interior of the refractory slab and the angle iron is unaffected by high temperatures to thereby adequately support the reinforcing rods and refractory slab exposed to high temperatures.

5. In combination with a longitudinal trough for holding flowing molten metal; and a longituinal sill on both sides of the trough, a self-reinforcing insulative panel lamina for insulating the molten metal comprising:
   a. a one piece generally rectangular refractory slab supported at opposite ends thereof on the sills and spanning the trough to create an unsupported portion between the sills;
   b. at least one reinforcing rod extending through the refractory slab in a direction perpendicular to the flow of the molten metal;
   c. a generally rectangular insulation layer substantially coextensive with the refractory slab and having top and bottom surfaces, the bottom surface being supported on the refractory slab to create a hot zone between the molten metal and the insulation layer and a cold zone above the insulation layer;
   d. reinforcing means placed on the top surface of the insulation layer and terminating above the sills for being supported in the cold zone solely by the insulation layer while simultaneously supporting the unsupported portion of the refractory slab spannng the trough between the sills; and
   e. tie means for joining the reinforcing means in the cold zone to the reinforcing rods in the hot zone, so that the portions of the refractory slab and insulation layer overlying the sills support the portion of the reinforcing means terminating above the sills to thereby enable the portion of the reinforcing means terminating above the sills to reinforce the unsupported portion of the refractory slab between the sills and the reinforcing means in the cold zone is unaffected by the high temperatures in the hot zone to thereby permit the reinforcing means to support the reinforcing rods in the hot zone.

6. The combination of claim 5 wherein the insulation layer comprises a lightweight refractory fiber insulating board.

7. The combination of claim 6 wherein the insulation layer is a composition comprising 30% high temperature refractory cement, 30% SiO$_2$-C powder, 25 mesh, 40% SiO$_2$-C ⅛" granules with a particle size retained by ⅛" mesh screen, and wherein the powder comprises 84% SiO$_2$, 15% carbon, 1% other elements, and the granules comprise 96% SiO$_2$, 3% carbon and 1% other elements.

8. In combination with a longitudinal trough for holding flowing molten metal, and a longitudinal sill on both sides of the trough, a self-reinforcing insulative panel lamina for insulating the molten metal comprising:
   a. a one piece generally rectangular refractory slab supported at opposite ends thereof on the sills and spanning the trough to create an unsupported portion between the sills;
   b. at least one reinforcing rod extending through the refractory slab in a direction perpendicular to the flow of the molten metal;
   c. a generally rectangular insulation layer substantially coextensive with the retractory slab and having top and bottom surfaces, the bottom surface being supported on the refractory slab to create a hot zone between the molten metal and the insulation and a cold zone above the insulation layer;
   d. an angle iron generally coextensive in length with and in facing contact with the top surface of the insulation layer and in vertical alignment with each refractory slab reinforcing rod, the angle iron being placed in an inverted V on the insulation layer with the angle iron edges being in contact with the insulation layer, the angle iron having ends located vertically over the trough sills to span the trough and thereby enable the portion of the angle iron that spans the trough to support the unsupported portion of the refractory slab; and
   e. tie means for joining the angle iron in the cold zone to the reinforcing rod in the hot zone, so that the portions of the refractory slab and insulation layer overlying the sills support the portion of the angle iron terminating above the sills to thereby enable the portion of the angle iron terminating above the sills to reinforce the unsupported portion of the refractory slab between the sills and the angle iron in the cold zone is unaffected by the high temperatures in the hot zone to thereby permit the angle iron to support the reinforcing rod in the hot zone.

* * * * *